United States Patent
Magnussen

(10) Patent No.: US 8,692,174 B2
(45) Date of Patent: Apr. 8, 2014

(54) INSOLATION SENSOR FOR SOLAR LIGHT INTENSITY HAVING A PRECIPITATION SENSOR OR DEPOSIT SENSOR ASSOCIATED THEREWITH

(75) Inventor: Bjoern Magnussen, Kassel (DE)

(73) Assignee: SMA Solar Technology AG, Niestetal (DE)

(*) Notice: Subject to any disclaimer, the term of this patent is extended or adjusted under 35 U.S.C. 154(b) by 329 days.

(21) Appl. No.: 13/161,773

(22) Filed: Jun. 16, 2011

(65) Prior Publication Data

US 2011/0308318 A1    Dec. 22, 2011

(30) Foreign Application Priority Data

Jun. 22, 2010 (EP) .................................. 10166859

(51) Int. Cl.
*G01C 21/02* (2006.01)

(52) U.S. Cl.
USPC ...................................................... 250/203.4

(58) Field of Classification Search
USPC ...................................................... 250/203.4
See application file for complete search history.

(56) References Cited

U.S. PATENT DOCUMENTS

| | | | |
|---|---|---|---|
| 4,080,075 A | 3/1978 | Berg | |
| 5,264,691 A | 11/1993 | Hegyi | |
| 2009/0014057 A1 | 1/2009 | Croft et al. | |
| 2009/0079384 A1* | 3/2009 | Harris | 320/102 |
| 2009/0182532 A1 | 7/2009 | Stoeber et al. | |
| 2009/0266353 A1* | 10/2009 | Lee | 126/593 |
| 2009/0314279 A1 | 12/2009 | Karim et al. | |
| 2010/0072859 A1 | 3/2010 | Jager et al. | |

FOREIGN PATENT DOCUMENTS

| | | |
|---|---|---|
| DE | 102006008178 A1 | 8/2007 |
| DE | 102008003272 A1 | 7/2009 |
| DE | 10009463 A1 | 2/2011 |
| FR | 2944143 A1 | 10/2010 |
| JP | 62251230 | 2/1987 |
| JP | 2000284017 A | 10/2000 |
| JP | 2005101103 A | 4/2005 |
| JP | 2006170768 A | 6/2006 |
| JP | 2009043987 | 2/2009 |
| KR | 1020040105099 A | 6/2006 |
| KR | 100997774 B1 | 1/2010 |
| WO | 9303492 A1 | 2/1993 |
| WO | 2007095893 A1 | 8/2007 |
| WO | 2009044982 A1 | 4/2009 |

OTHER PUBLICATIONS

European Search Report dated May 26, 2011 for Application No. EP 10166859. 2 Pages.
European Search Report dated Oct. 4, 2011 for Application No. EP 10166859. 3 Pages.

* cited by examiner

*Primary Examiner* — Thanh Luu
(74) *Attorney, Agent, or Firm* — Eschweiler & Associates, LLC

(57) ABSTRACT

An insolation sensor is disclosed and is used to determine a solar light intensity as a basis for evaluating electric power generated by solar modules exposed to the solar light intensity. The insolation sensor includes an outer surface including a light entrance window, and at least one photo sensor configured to measure the solar light intensity. The at least one photo sensor is arranged behind the light entrance window. The insolation sensor further includes a detector device configured to detect precipitation and/or a resulting deposit on the surface which both affects the insolation sensor and the solar modules.

6 Claims, 2 Drawing Sheets

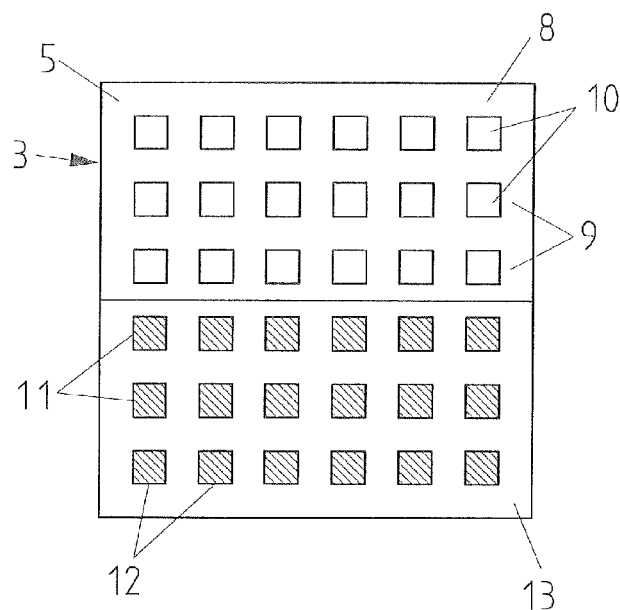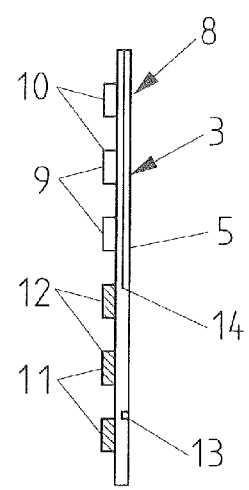
Fig. 5
Fig. 6
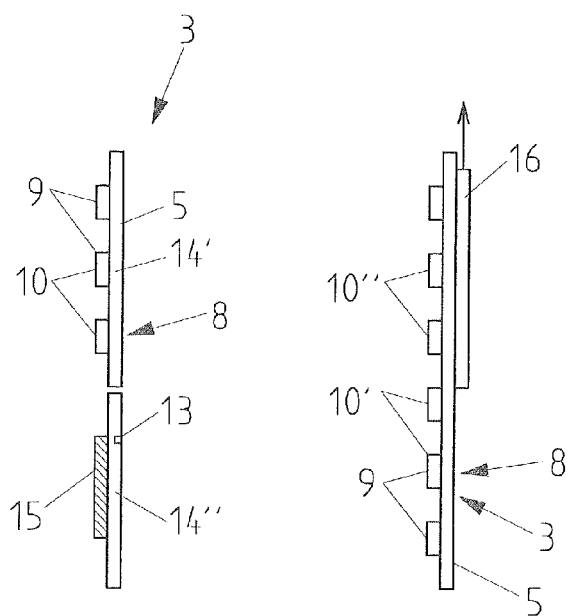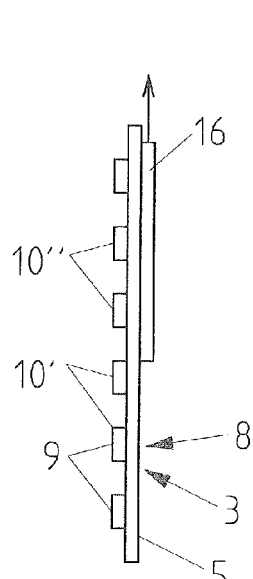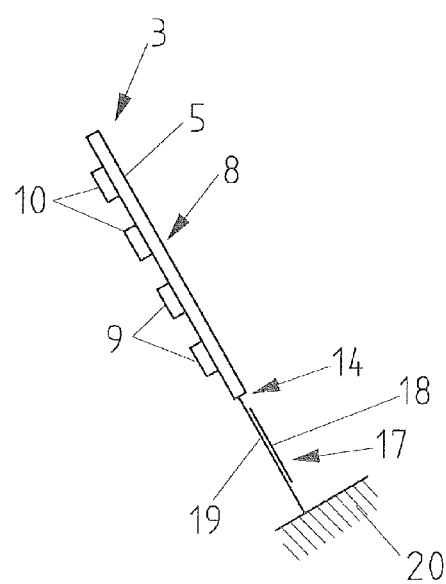
Fig. 7
Fig. 8
Fig. 9

INSOLATION SENSOR FOR SOLAR LIGHT INTENSITY HAVING A PRECIPITATION SENSOR OR DEPOSIT SENSOR ASSOCIATED THEREWITH

REFERENCE TO RELATED APPLICATIONS

This application claims priority to co-pending European Patent Application No. 10 166 859.8, filed Jun. 22, 2010.

FIELD

The present invention relates to an insolation sensor for determining a solar light intensity as a basis for evaluating the electric power of solar modules exposed to the solar light intensity.

An insolation sensor to which the present invention relates is generally not provided for generating electric energy based on the solar light intensity. Instead, in one embodiment it will solely serve to measure the solar light intensity to have a criterion for assessing solar modules of a photovoltaic systems which are exposed to the same solar light intensity. Such an insolation sensor typically comprises an active surface whose surface area is just a fraction of the surface area of the solar modules arranged in parallel thereto. Further, the insolation sensor typically is arranged closely beside or between the solar modules to be assessed, and oriented in a same direction as the solar modules.

BACKGROUND

From DE 10 2008 003 272 A1 it is known to survey a photovoltaic system with regard to its function. For this purpose, a motion sensor is arranged at the solar modules. This motion sensor allows for detecting movements in case of theft or due to strong wind or storm. Further, a temperature sensor is provided which surveys the environmental temperature increasing in case of a fire. By means of surveying the power produced by the solar modules it shall also be recognized whether snow lies on the photovoltaic system or whether any contamination affects the performance of the system.

A method of surveying solar driven power plants is known from DE 10 2006 008 178 A1, in which the produced power is continuously monitored by comparing the power measured for its individual solar modules. Such comparisons may also be made between a fixed reference module and at least some of the solar modules. Preferably, the reference module is a module which has the same physical properties as the solar modules and which is exposed to the solar light intensity in direct proximity to and under the same conditions as the solar modules. In DE 10 2006 008 178 A1 a contamination of and damage to the solar modules by weather conditions are indicated as variables that have an influence on the power produced by the solar modules.

An array of photo sensors which is arranged with respect to a shadowing device is known from US 2009/0314279 A1. The signals of the individual photo sensors are used to orient a solar module which is in a fixed arrangement with the array and the shadowing device in an optimum way with regard to the position of the sun.

A uniform contamination both of an insolation sensor and the associated solar modules may not be detected by comparing the solar light intensity detected with the insolation sensor with the electric power produced by the solar modules. Similarly, all other external influences which affect both the insolation sensor and the solar modules may not be resolved by means of a comparison between them.

Thus, there still is a need for an insolation sensor by which external influences, particularly due to precipitation, can be detected even if these external influences both affect the insolation sensor and the solar modules surveyed by means of the insolation sensor.

SUMMARY

In an aspect, the present invention provides an insolation sensor for determining a solar light intensity as a basis for evaluating electric power generated by solar modules exposed to the solar light intensity. The insolation sensor comprises an outer surface including a light entrance window; at least one photo sensor measuring the solar light intensity, which is arranged behind the light entrance window; and a detector device detecting precipitation and a resulting deposit on the surface of the insolation sensor.

In another aspect, the present invention provides a system for evaluating electric power generated by solar modules exposed to a solar light intensity. The system comprises an insolation sensor for determining the solar light intensity. The insolation sensor comprises an outer surface including a light entrance window; at least one photo sensor measuring the solar light intensity, which is arranged behind the light entrance window; and a detector device detecting precipitation and a resulting deposit on the surface of the insolation sensor. The detector device comprises an array of sensors that are arranged behind at least one surface selected from the outer surface and a comparison surface arranged in parallel to and laterally beside the outer surface. The sensors of the detector device are distributed over a surface area of 25 to 250 $cm^2$ and comprise a distance to each other of not more than 5 cm. Further, the detector device comprises a comparator to compare signals from the individual sensors to each other.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention will be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 5 is a view of the light entrance window and a comparison surface arranged beside the light entrance window of still a further insolation sensor.

FIG. 6 is a side view of the arrangement of FIG. 5.

FIG. 7 is a side view of an embodiment of the insolation sensor which is an alternative to FIGS. 5 and 6.

FIG. 8 is a side view of a further alternative to the insolation sensor according to FIGS. 5 and 6; and FIG. 9 illustrates an insolation sensor and the associated support structure into which a load cell is integrated.

DETAILED DESCRIPTION

Figure 1:
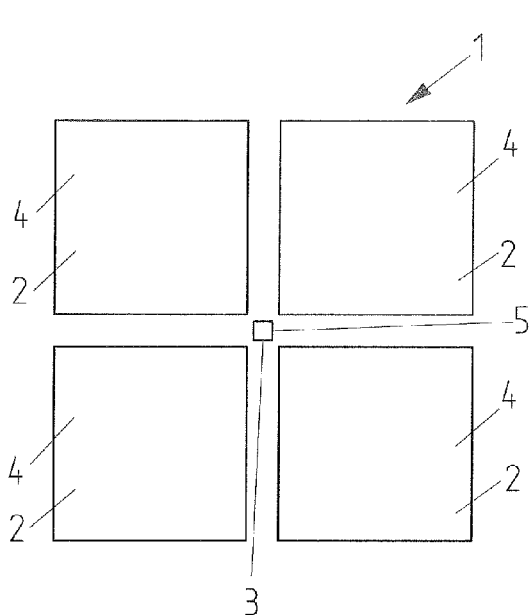
FIG. 1 is a schematic top view of a photovoltaic system comprising four solar modules and a central insolation sensor.

In the insolation sensor according to the present invention, a detector device is provided that detects or recognizes precipitation on the surface of the light entrance window of the insolation sensor and/or a persistent deposit on the surface thereof resulting from the precipitation. This information is available from the insolation sensor in addition to the light intensity originally detected by the insolation sensor. The information may be used to correct the measurement value of the solar light intensity, as precipitation or a resulting deposit on the surface may have the result that the originally measured light intensity is false, i.e. not the true light intensity. The information on precipitation or a resulting deposit on the surface of the light entrance window may, however, be used exclusively for triggering inspection or cleaning measures, for example. These inspection and cleaning measures will of course not only be carried out with regard to the insolation sensor in one embodiment, but also with regard to the solar modules surveyed by means of the insolation sensor. The significance of a detected deposit on the surface of the insolation sensor is particularly high if the surface of the insolation sensor is arranged in parallel to the surveyed solar modules.

Detecting precipitation or a resulting deposit on the surface of the light entrance window of the insolation sensor does not necessarily have to take place directly at this surface. Instead, a comparison surface of the insolation sensor which is arranged in parallel to and beside the surface of its light entrance window may be used for this purpose. In fact, if "the surface", particularly "the surface of the light entrance window of the insolation sensor", is mentioned here, this is always to be understood as to also include a comparison surface which is additionally or alternatively arranged in parallel to and beside the original surface of the light entrance window, even if this is not explicitly stated, as long as nothing else is indicated in the individual case. This comparison surface in one embodiment, however, is a surface of the insolation sensor or of the detector device for detecting precipitation and/or a resulting deposit on the original surface of the light entrance window but no surface of the solar modules surveyed by means of the insolation sensor.

The insolation sensor may comprise an array of sensors behind the surface, the signals of which are compared to each other. Different forms of precipitation, like for example rain, are characterized in that they—at least over short observation times—have no homogeneous effect on the surface. These inhomogeneities, in case of rain, for example due to impacts of individual rain drops on the surface, can be detected by sensors that are arranged in a suitable array. In one embodiment an array that may be regarded as suitable has to have a certain minimum size, and the distances between the individual sensors may not be too great, if the inhomogeneities are to be detected and resolved so far as possible. Sensor arrays that have an area of 25 to 250 $cm^2$ and in which the individual sensors are arranged at a distance of not more than 5 cm prove as suitable for detecting the relevant inhomogeneities displayed by rain, for example. The upper limit of 250 $cm^2$ mentioned does not result from the requirement of resolving inhomogeneities of precipitation on the surface, but indicates a suitable maximum size of an insolation sensor according to the present invention.

The particular in homogeneities that are detected with the array of sensors depend on the kind of precipitation and also on the kind of the sensors used. However, the rule applies that, in one embodiment, a certain signal pattern from the array of sensors corresponds to a certain kind of precipitation that may thus be recognized due to the signal pattern.

In one embodiment the sensors of the array may be the same photo sensors by which the insolation sensor according to the present invention also measures the solar light intensity. Whereas for measuring the solar light intensity averaging over the individual photo sensors is suitable as a rule, the signals from the individual photo sensors will be individually evaluated or compared with each other in detecting or recognizing the precipitation.

The sensors of the array may also be capacitive sensors in one embodiment. In any detector device for detecting precipitation and/or a resulting deposit on the surface of an insolation sensor, a capacitive sensor may be an advantage because precipitation or a deposit on the surface can be recognized even without sensors arranged side by side providing different signals. Thus, known rain sensors of motor vehicles make use of such capacitive sensors. By means of arranging several capacitive sensors in an array, further information on the kind of the precipitation may be gathered.

The detector device for detecting precipitation and/or a resulting deposit on the surface of the insolation sensor according to the present invention may also monitor the physical mass of a body of the insolation sensor comprising the surface. Precipitation increases the mass of this body. The time course of this increase is characteristic of the respective precipitation. Precipitation of dust or other particles out of the air results in a slow but substantially continuously accumulating increase of the mass of the body, whereas rain results in a temporary increase of the mass. Thus, the particular course of the temporary increase of the mass allows for conclusions on the intensity of the rain and other conditions of the rain.

For the purpose of determining the mass of the body, a load cell supporting the body or being arranged at a support of the body may be provided in one embodiment.

An even higher sensitivity in determining the mass of the body may, for example, be achieved if an eigenfrequency of the body is monitored which depends on its mass. For this purpose, in one embodiment the detector device may comprise a mechanical-electrical converter which is coupled to the body comprising the surface. The mechanical-electrical converter may, for example, interrogate the eigenfrequency of the body by means of a sweep signal. In doing so, an attenuation of the body due to the deposited precipitation may also be measured that allows for drawing conclusions on the kind of a deposit on the surface.

In the insolation sensor according to one embodiment of the present invention, a mechanical-electrical converter may also be provided for detecting impact sound for which the body of the insolation sensor is excited as a result of precipitation. The impact sound spectrum allows for drawing some conclusions on the kind of the precipitation engaging the surface of the body.

In one embodiment, the insolation sensor according to the present invention comprises a contamination protection cover that partially covers the surface. In the covered area of the surface, contamination of the surface by precipitation of any kind is avoided. When the contamination protection cover is removed, conclusions may be drawn on the deposit on the parts of the surface that have not been covered by comparing signals from the parts of the surface that have not been covered and from the parts of the surface that have been covered. In one embodiment, the contamination protection cover can be removed by a motor.

The detector device of the insolation sensor according to the present invention for detecting precipitation or a resulting deposit on the surface may also determine the spectral distribution of the light transmitted by the surface. This spectral distribution is at least partially dependent on the deposit on the surface resulting from precipitation, and thus allows for drawing conclusions on the deposit on the surface. This particularly applies if the spectral distribution is compared with other information gathered according to the present invention.

This other information may also include a directional distribution of the light transmitted by the surface of the insolation sensor. Any deposit on the surface, as a rule, results in a more diffuse scattering of the transmitted light which can be detected behind the surface. For determining the directional distribution of the light transmitted by the surface of the insolation sensor, the insolation sensor according to the present invention may also have photo sensors oriented in different directions.

It is also an advantage if the detector device for detecting precipitation and/or a resulting deposit on the surface comprises further sensors, like for example for the temperature and/or the atmospheric humidity and/or the wind velocity and/or the wind direction in the surroundings of the insolation sensor. Additionally, means may be provided which signal the date and/or the time and/or the position and/or the orientation of the insolation sensor to include this information in determining precipitation or a resulting deposit on the surface.

The insolation sensor according to the present invention, besides assessing solar modules with regard to their electric power, may also be used for surveying solar modules with regard to theft as the sensors provided in the insolation sensor according to the present invention also respond to the particular circumstances of a theft of the modules like for example vibrations, tilt variations, conspicuous coverings and so on. Thus, the insolation sensor may be used to output a theft warning signal upon such a response by its sensors.

Figure 2:
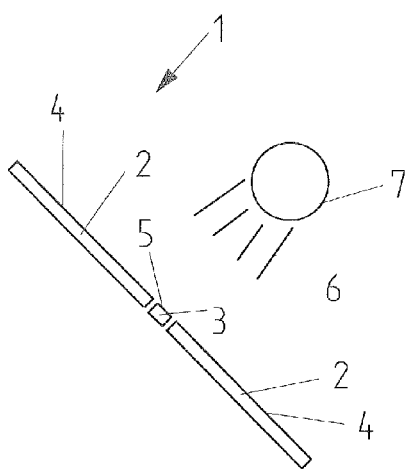
FIG. 2 is a side view of the photovoltaic system according to FIG. 1.

The solar system 1 illustrated in FIGS. 1 and 2 comprises four solar modules 2 and an insolation sensor 3 centrally arranged between the solar modules 2. The surfaces 4 of the solar modules 2 and the surface 5 of a light entrance window of the insolation sensor 3 are arranged in parallel to each other so that the angle of incidence of the light 6 from the sun 7 is the same on each surface 4 and 5. The insolation sensor 3 serves to determine the solar light intensity of the light 6 from the sun 7. With the aid of this information, the electric power of the solar modules 2 may be assessed. This information may also be used to determine the operation conditions of the solar modules 2 and/or determine how much power the solar modules 2 could provide or should provide under optimum operation conditions. Any precipitation on the photovoltaic system 1 in the form of dust, rain, snow, condensed fog or the like generally uniformly affects both the insolation sensor 3 and the solar module 2 at least if they generally have same physical properties. Nevertheless, the present invention relates to detecting and analyzing such precipitation or a resulting deposit on the surface 5.

Figure 3:
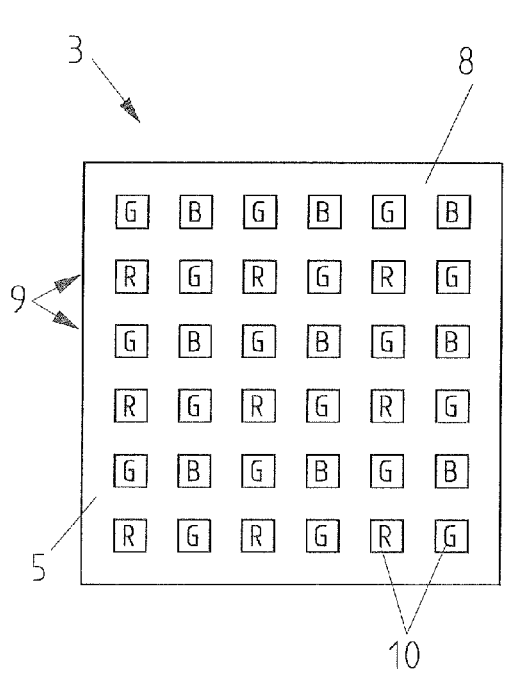
FIG. 3 is a view of the light entrance window of the insolation sensor according to FIGS. 1 and 2.

FIG. 3 shows a light entrance window 8 of the insolation sensor 3, whose surface 5 in one embodiment covers the entire active surface of the insolation sensor 3 used for data gathering. An array 9 of photo sensors 10 is located behind the light entrance window 8. The collectivity of the photo sensors 10 serves to determine the solar light intensity which is transmitted by the light entrance window 8. At the same time, the signals from the individual photo sensors 10 are compared to each other to detect variations over the surface 5 which are an indication of precipitation on the surface 5. For example, a raindrop may reduce the light intensity measured by photo sensors 10 lying below its point of impact, whereas it does not influence the light intensity measured by neighboring photo sensors 10. Rain water running down in individual tracks also results in a distinctive variation of the light intensity detected by the individual photo sensors 10.

Further, a Bayer-matrix of photo sensors which, due to colour filters, are specifically sensitive for red, green and blue light is indicated by letters R, G and B in the boxes representing the photo sensors 10 in one embodiment. This arrangement corresponds to that one of photo sensors in an RGB colour video camera chip. It allows for gathering spectral information on the light transmitted by the light entrance window 8. This information also includes indications of precipitation or a resulting deposit on the surface 5, particularly if it is compared with other information which is obtained according to the present invention.

Figure 4:
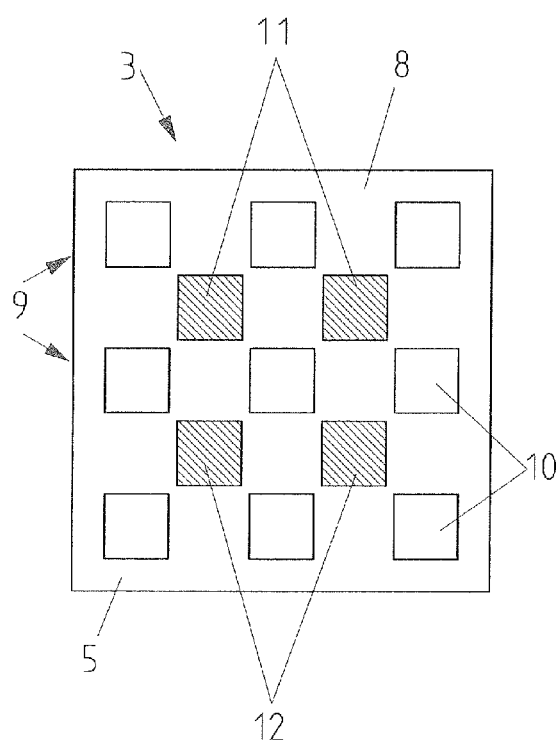
FIG. 4 is a view of the light entrance window of another insolation sensor.

In the insolation sensor 3 according to another embodiment illustrated in FIG. 4, beside the photo sensors 10, capacitive sensors 11 are arranged in an array 12 behind the light entrance window 8. The capacitive sensors 11 may alone or in addition to the photo sensors 10 be used to characterize precipitation or a resulting deposit on the surface 5.

In the insolation sensor 3 according to another embodiment illustrated in FIG. 5, again an array 9 of photo sensors 10 and an array 12 of capacitive sensors 11 are provided. Here, however, only the photo sensors 10 are arranged behind the light entrance window 8, whereas the capacitive sensors 11 are arranged behind a comparison surface 13 which is arranged in parallel to and besides the surface 5 of the light entrance window 8. The comparison surface 13, however, also counts as part of the active surface of the insolation sensor 3. The side view according to FIG. 6 reveals that, in the present embodiment, the entire active surface of the insolation sensor 3, i.e. including its comparison surface 13, is made of a single body 14, like for example a glass panel.

This is different in the embodiment of the insolation sensor 3 illustrated in FIG. 7. Here, the photo sensors 10 are arranged behind a partial body 14' having the surface 5, whereas the comparison surface 13 is that one of a partial body 14". At this partial body 14" a mechanical-electrical converter 15 is arranged by which the eigenfrequency of the partial body 14", which depends on the deposit on the surface 13 and on the attenuation of the partial body 14" as a result of precipitation, can be measured. Alternatively, the mechanical-electrical converter may also be made as an impact sound microphone for detecting impact sound vibrations of the partial body 14" due to precipitation.

FIG. 8 illustrates another embodiment of the insolation sensor 3 in which a contamination protection cover 16 is provided over a part of the surface 5 behind which photo sensors 10" are located, whereas photo sensors 10' behind another part of the surface 5 are not covered by the contamination protection cover 16. The contamination protection cover 16 is removable in one embodiment by means of a motor in the direction of an arrow, to obtain a comparison measurement value with the photo sensors 10" which is not influenced by the deposit on the surface 5, whereas the measurement value of the photo sensors 10' is influenced by precipitation and a resulting deposit on the surface 5.

FIG. 9 illustrates the option of measuring a change in mass of the body 14 comprising the surface 5 by means of a load cell 17 which has the form of a resistance strain gauge 18 which is provided at a support arm 19 supporting the insolation sensor 3 with regard to a base 20 here. It is to be understood that in one embodiment the load cell 17 also detects wind loads and the like on the insolation sensor 3.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

The invention claimed is:

1. An insolation sensor for determining a solar light intensity as a basis for evaluating electric power generated by solar modules exposed to the solar light intensity, the insolation sensor comprising:
    an outer surface including a light entrance window;
    at least one photo sensor configured to measure the solar light intensity, wherein the at least one photo sensor is arranged behind the light entrance window; and
    a detector device configured to detect precipitation and/or a resulting deposit on the outer surface,
    wherein the detector device further comprises a plurality of photo sensors configured to determine a spectral distribution of light received at at least one surface selected from the outer surface and a comparison surface arranged in parallel to and laterally beside the outer surface, and wherein the detector device is configured to detect precipitation and/or a resulting deposit on the outer surface in response thereto.

2. The insolation sensor of claim 1, further comprising a contamination protection cover that at least partially covers at least one surface selected from the outer surface and a comparison surface arranged in parallel to and laterally beside the outer surface.

3. The insolation sensor of claim 2, wherein the contamination protection cover is removable by means of a motor or other type actuator.

4. An insolation sensor for determining a solar light intensity as a basis for evaluating electric power generated by solar modules exposed to the solar light intensity, the insolation sensor comprising:
    an outer surface including a light entrance window;
    at least one photo sensor configured to measure the solar light intensity, wherein the at least one photo sensor is arranged behind the light entrance window; and
    a detector device configured to detect precipitation and/or a resulting deposit on the outer surface,
    wherein the detector device further comprises a plurality of photo sensors oritented in different directions, and is configured to determine a directional distribution of light received at at least one surface selected from the outer surface and a comparison surface arranged in parallel to and laterally beside the outer surface and detect precipitation and/or a resulting deposit on the outer surface in response thereto.

5. The insolation sensor of claim 4, further comprising a contamination protection cover that at least partially covers at least one surface selected from the outer surface and a comparison surface arranged in parallel to and laterally beside the outer surface.

6. The insolation sensor of claim 5, wherein the contamination protection cover is removable by means of a motor or other type actuator.

* * * * *